United States Patent [19]

Mitchell

[11] B 3,999,587

[45] * Dec. 28, 1976

[54] PNEUMATIC TIRE AND WHEEL RIM ASSEMBLIES

[75] Inventor: William Eric Mitchell, Coventry, England

[73] Assignee: Dunlop Limited, London, England

[22] Filed: Nov. 11, 1974

[21] Appl. No.: 522,537

[*] Notice: The portion of the term of this patent subsequent to Nov. 11, 1992 has been disclaimed.

[44] Published under the second Trial Voluntary Protest Program on March 30, 1976 as document No. B 522,537.

Related U.S. Application Data

[63] Continuation-in-part of Ser. No. 420,596, Nov. 30, 1973, Pat. No. 3,918,508.

[30] Foreign Application Priority Data

| Dec. 6, 1972 | United Kingdom | 56311/72 |
| June 30, 1973 | United Kingdom | 31287/73 |
| June 30, 1973 | United Kingdom | 31288/73 |
| Nov. 9, 1974 | United Kingdom | 48594/74 |
| Nov. 9, 1974 | United Kingdom | 48592/74 |

[52] U.S. Cl. .................. 152/379 S; 152/381 R
[51] Int. Cl.² ................................. B60C 15/06

[58] Field of Search .......... 152/381, 379, 399, 158, 152/400, 366, 343, 344, 345, 430; 301/8

[56] References Cited

UNITED STATES PATENTS 3,638,701 2/1972 Rossler ............... 152/158

FOREIGN PATENTS OR APPLICATIONS

| 222,768 | 10/1924 | France | 152/381 |
| 722,953 | 1/1932 | France | 152/381 |

Primary Examiner—Trygve M. Blix
Assistant Examiner—Reinhard J. Eisenzopf
Attorney, Agent, or Firm—Stevens, Davis, Miller & Mosher

[57] ABSTRACT

A pneumatic tire and wheel rim assembly capable of being run in a deflated condition comprises a wheel rim having a pair of bead seats, a circumferential well disposed between the bead seats, and closure means for the well defining in combination with one of the bead seats a circumferential notch. A pneumatic tyre comprising a tread, sidewalls and beads for seating on the bead seats of the wheel rim is mounted on the wheel rim, one of the beads being provided with an extended toe portion which projects into the notch to restrain the bead from axial inward displacement.

8 Claims, 10 Drawing Figures

PNEUMATIC TIRE AND WHEEL RIM ASSEMBLIES

This application is a continuation-in-part of applicant's copending U.S. patent application Ser. No. 420,596 filed Nov. 30, 1973, now U.S. Pat. No. 3,918,508.

This invention relates to pneumatic tire and wheel rim assemblies and to wheel rim assemblies therefor.

In the event of the sudden deflation of a pneumatic tire on a moving vehicle the beads of the tire are liable to be axially displaced from their bead seats and in the case of a tire mounted on a well base rim may fall into the well of the rim. In this condition, the steering control of the vehicle is severely impaired and the tire may even be dragged completely off the rim.

Accordingly the present invention provides a pneumatic tire and wheel rim assembly capable of being run in a deflated condition comprising a rim having a pair of bead seats and a circumferential well disposed between the bead seats, closure means for the well defining in combination with one of the bead seats a circumferential notch, and a pneumatic tire comprising a tread, sidewalls and beads for seating on the bead seats of the wheel rim, at least the bead on the bead seat adjacent the notch having an extended toe portion projecting into the notch to restrain the bead from axial inward displacement.

The present invention also provides a wheel rim assembly comprising a rim having a pair of bead seats and a circumferential well disposed between the bead seats and closure means for the well free of any projection radially outwardly from the rim greater than will permit a tire bead to pass over it, said closure means defining in combination with one of the bead seats a circumferential notch for receiving the toe of a tire bead when the assembly is used with a tire mounted thereon to restrain the tire bead from axial inward displacement.

Specific embodiments of the present invention will now be described by way of example and with reference to FIGS. 1 to 10 of the accompanying drawings in which.

Figure 1:
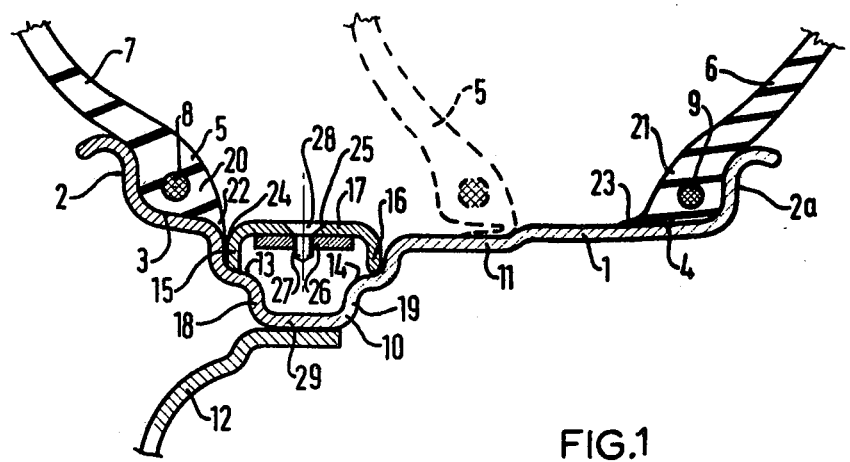
FIG. 1 is an axial cross-sectional view of part of a first tire and wheel rim assembly, showing in dotted lines a tire bead in an axially displaced position.

As shown in FIG. 1, a wheel rim 1 comprises two annular bead retention flanges 2 and 2a and two bead seats 3 and 4 which support the beads 5 and 6 of an associated pneumatic tire, the beads being reinforced with inextensible bead wires 8 and 9. Disposed between the bead seats 3 and 4 is a circumferentially extending stepped well 10 of reduced width compaired to the width of a conventional well and offset to be adjacent the outboard bead seat 3 of the rim 1. The remainder of the rim base forming part of the well 10 comprises a slightly radially inwardly depressed portion 11 adjacent the inboard bead seats 4. A wheel disc 12 of a conventional type is welded to the base 29 of the well 10.

Figure 2:
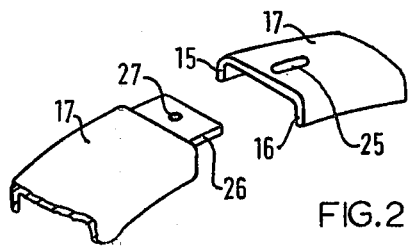
FIG. 2 is a perspective view of part of a band for covering the well of the rim in accordance with the invention.

The sides 18 and 19 of the well 10 are provided with axially extending steps or grooves 13 and 14 which extend around the periphery of the rim and are arranged to support the radially turned edges 15 and 16 of a band 17 of mild or spring steel, the band 17 being of sufficient width to cover the well 10. The steel band 17 (as shown in FIG. 2) is substantially circular and is split at one point of its circumference, one end being provided with a circumferentially extending slot 25 and the other end having a tongue portion 26 containing a screw-threaded hole 27 into which a clamping screw 28 passing through the slot of the other end is inserted to provide releasable securing means for the band.

The radially inwardly turned edge 15 of the steel band 17 adjacent the outboard bead seat 3 defines a circumferential notch 24 with side 18 of the well 10. The tyre beads 5,6 are provided with extended rubber toes 22,23, the extended toe 22 of the outboard bead 5 projecting into the notch 24 to restrain the bead against axial displacement across the radially outer face of the band 17 as described in commonly assigned co-pending U.S. patent application Ser. No. 276,449, filed July 31, 1972, now U.S. Pat. No. 3,857,429, Dec. 31, 1974.

To assemble the tire onto the rim the inboard tire bead is positioned on its associated bead seat by conventional means employing the well to enable the bead to be passed over the outboard flange 2.

The outboard bead 5 is similarly positioned on the rim and then pushed axially across the depressed portion 11 of the rim base clear of the well 10 as shown in dotted lines in FIG. 1.

The steel band 17 is loosely positioned in the well 10 with the radially inwardly turned edges 15 and 16 of the band resting against the steps 13 and 14 of the well 10. The band is pulled tight to assume the approximate diameter of tire beads 5 and 6 and the clamping screw 28 is tightened to hold the band in position.

When the band 17 is secured in position, the outboard tire bead 5 is moved back over the band 17, the extended toe 22 riding fairly easily over the band in this direction of movement, and the bead 5 is then positioned on its bead seat 3. The tire may then be inflated by conventional means. The extended toe 22 is located in the radially inwardly tapering notch 24 formed between the side 18 of the well 10 and the radially inwardly turned edge 15 of the band, and serves to resist axial movement of the bead 5 away from its seat.

In a second embodiment of the present invention as shown in FIGS. 3 to 8, the screw connection of FIGS. 1 and 2 is replaced by a link 40 made from stiff steel wire 3.18 millimeters (⅛ of an inch) in diameter and hooked at its ends 41 and 42 through slots 43 and 44 formed respectively in a split band 45, having ends 45a, 45b, which is similar in its general form to the band 17 of FIGS. 1 and 2.

Figure 3:
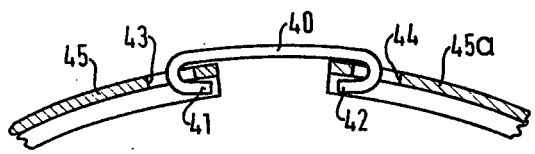
FIG. 3 is a scrap cross-sectional view in the axial direction showing a modified well cover band in accordance with the present invention.
Figure 4:
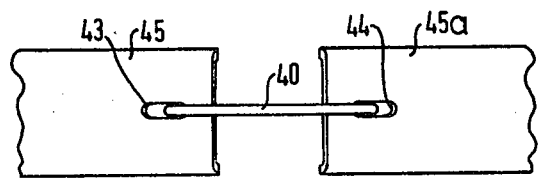
FIG. 4 is a plan view, in the radial direction looking towards the axis of the wheel, of the arrangement shown in FIG. 3.

FIGS. 3 and 4 show the link 40 in its undeformed state, the hook portions 41,42 being inserted in the slots 43 and 44 to secure the band in position around a wheel rim well, but in order to hold the band 45 firmly in position the link 40 is subsequently deformed to a "Z-shape" incorporating a kink 46 as shown in FIG. 4. This is very easily accomplished by the use of a tool of the kind shown in FIGS. 6 and 7, which consists of an L-shaped handle 47 on which a square block 48 is formed, the block 48 having a slot 49 having a slightly greater width than the diameter of the wire forming the link 40 and having rounded ends 50.

Figure 5:
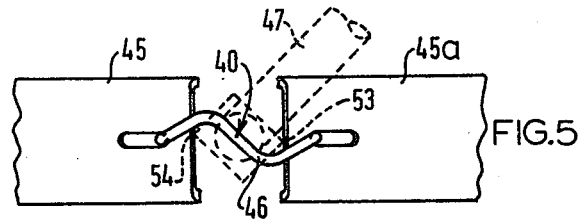
FIG. 5 is a view corresponding to FIG. 4 showing the tightened state of the band.
Figure 7:
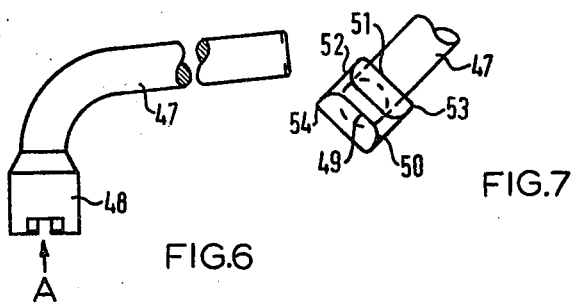
FIG. 7 is a view in the direction of the arrow 'A' of part of the tool shown in FIG. 6.
Figure 6:
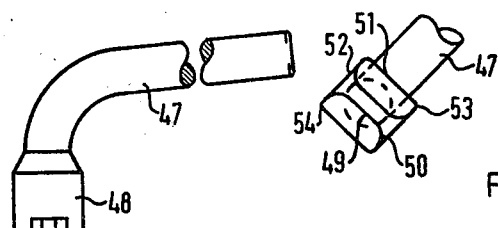
FIG. 6 is a side view of a tool for tightening the band.

By suitable choice of dimensions for the sides 51,52 of the block 48 and the undeformed length of the link 40 in relation to the desired final spacing of the ends of the band 45, it is possible to arrange that when the tool shown in FIGS. 6 and 7 is engaged with the link passing through the slot 49 a handle 47 can only be turned until the outer corners 53,54 of the tool abut the respective ends of the band as shown in dotted lines in FIG. 5. This serves to limit the angle through which the tool can be rotated and thus enables a predetermined degree of tightening of the band to be achieved.

Figure 8:
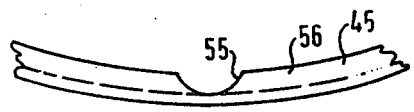
FIG. 8 is a view in the axial direction showing a part of the band.

FIG. 8 shows the part of the band 45 diametrically opposite the joint between its ends, in which a semi-circular notch 55 is formed in each of the radially inwardly turned edges 56. The notches 55 weaken the band and thus render it easier to fit to the rim. This arrangement is of course also applicable to the band 17 shown in FIGS. 1 and 2.

The fastening means described above is particularly cheap, easy to assemble and reliable both in assembly and subsequent operation.

While a simple wire link having a single kink is described above, the link may be of metal strip material or any other suitable material. The deformation may take the form of a kink or kinks of any desired contour including part-circular arcs or closed loops or twists. Multiple kinks or crimps may be employed to shorten the length of the link in order to tension the band.

The constructions described above not only prevents the outboard tire bead from being displaced into the well of the rim in the event of a puncture or blow-out but furthermore the projection of the extended toe on the outboard tire bead into the notch of inwardly tapering cross-section formed between the band and the rim resists axial displacement of the outboard bead over the band. This retention of the outboard bead on its seat has important advantages in improving the stability of a deflated tyre under cornering loads, and enables greater steering control to be maintained by the driver of a vehicle after a sudden deflation has occurred. The projection of the extended toe into the notch also improves the sealing of the outboard bead against loss of inflation pressure, a factor which is particularly important when the tyre is already partially deflated since in this condition its outboard bead may tend to move axially under cornering loads so as to expose the line of junction between the band and the wall of the rim well: such movement is resisted by the projection of the extended toe into the notch, and the toe also maintains close contact with the wall of the rim to provide an effective seal at all times even when the bead rocks on its seat.

Figure 9:
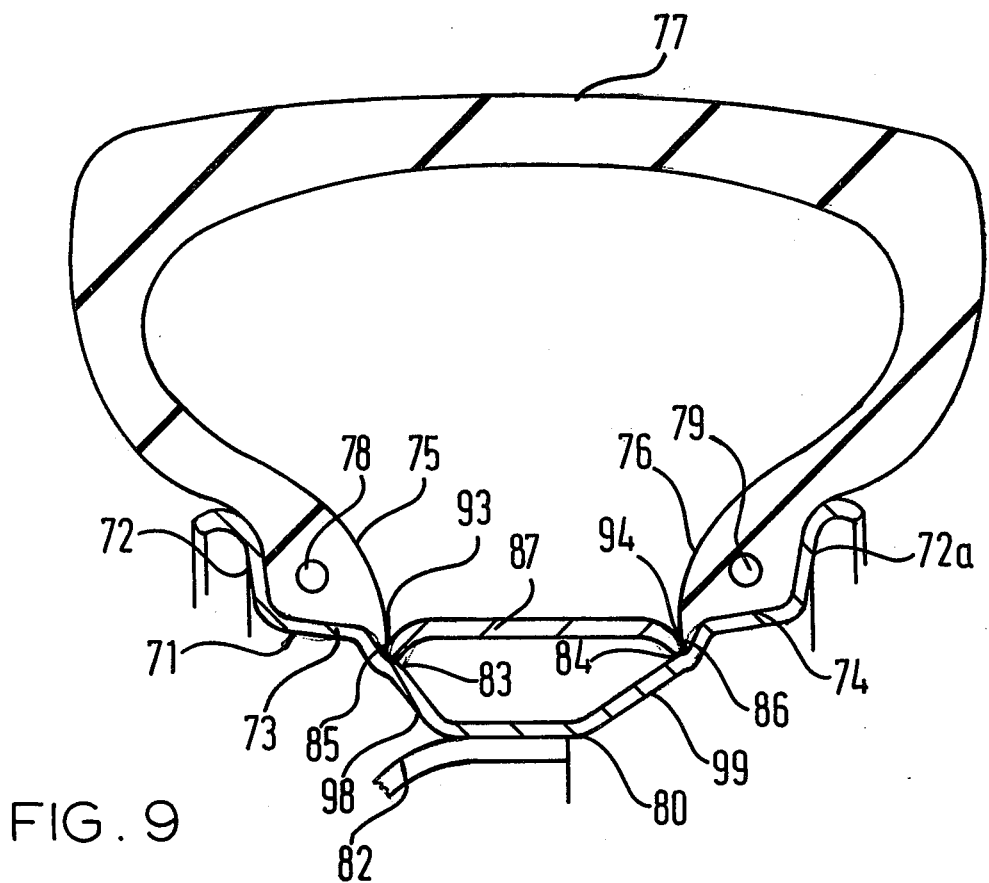
FIG. 9 is an axial cross-sectional view of a part of a second tire and wheel rim assembly.

The pneumatic tire and wheel rim assembly illustrated in FIG. 9 comprises a wheel rim 71 having two annular bead retention flanges 72, 72a and two bead seats 73,74 which support the beads 75,76 of a pneumatic tyre 77, the beads being reinforced with inextensible bead wires 78,79. Disposed between the bead seats 73,74 is a circumferentially extending stepped well 80. A wheel disc 82 of conventional type is welded to the base of the well 80.

The sides 98,99 of the well 80 are provided with axially extending steps 83,84 which extend around the periphery of the rim to support the radially turned edges 85,86 of a circular band 87 of mild or spring steel, the band 87 being of sufficient width to cover the well 80. The band 87 is split at one point of its circumference to enable it to be fitted over the well 80.

The radially inwardly turned edges 85,86 of the band 87 adjacent the bead seats 73,74 define circumferential notches 93,94 with the sides 98,99 of the well 80. The tire beads 75,76 are provided with extended rubber toes 68,69 which project into the notches 93,94 to restrain both beads 75,76 against axial displacement across the radially outer face of the band 87 as described in our co-pending U.S. patent application Ser. No. 276449.

To mount a tire on this wheel rim assembly the inboard tire bead 76 is located on its associated bead seat 74 in a conventional manner and the outboard bead pushed axially across the wheel rim 71 to the inboard side of the well 80 adjacent the inboard tire bead 76. The band 87 is then fed under the outboard tire bead 75 and its edge 86 located on the step 84. The other edge 85 of the band 87 is then located on the step 83 and, after fastening the band 87 tight to close the well 80 the outboard tire bead 75 is moved back over the band 87 onto its bead seat 73.

Figure 10:
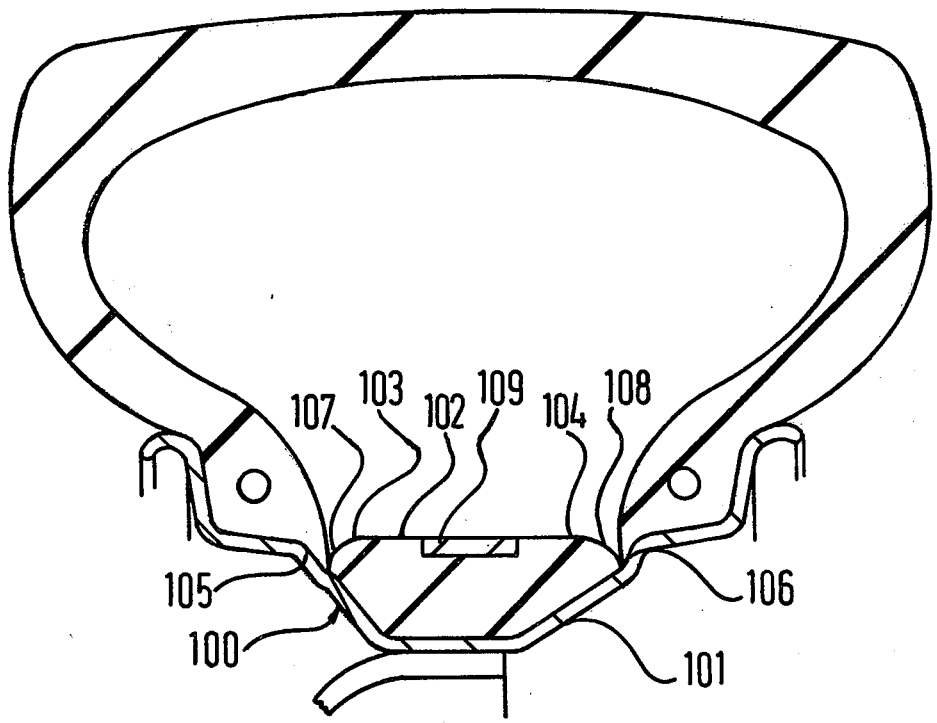
FIG. 10 is an axial cross-sectional view of an alternative wheel rim assembly.

The wheel rim assembly illustrated in FIG. 10 comprises a wheel rim 100, similar to the wheel rim illustrated in FIG. 9, having a well 101 closed by a solid well filler 102. The edges 103,104 of the well filler 102 are curved radially inwardly to define with the sides 105,106 of the well 101 circumferential notches 107,108, for receiving the extended rubber toes of the tire beads.

To facilitate positioning of the well filler 102 in the well 101, the well filler 102 is formed of a plurality of arcuate sections which are retained in the well 101 by a circular band 109.

The procedure for mounting a tire on this wheel rim assembly is similar to that described with reference to FIG. 9 except that with both tire beads positioned at one side of the wheel rim the well filler sections are placed in the well 101 and the band 109 pulled tight to hold the filler sections in position. The outboard tire bead is then moved back over the well filler 102 onto its bead seat.

Having now described my invention, what I claim is:

1. A pneumatic tire and wheel rim assembly capable of being run in a deflated condition comprising a wheel rim having a pair of bead seats, and a circumferential well disposed between the bead seats, closure means for the well free of any projection radially outwardly from the wheel rim greater than will permit a tire bead to pass over it, said closure means defining in combination with one of the bead seats a circumferential notch, and a pneumatic tire comprising a tread, sidewalls and beads for seating on the bead seats of the wheel rim, at least the bead on the bead seat adjacent the notch having an extended toe portion projecting into the notch to restrain the bead from axial inward displacement.

2. A pneumatic tire and wheel rim assembly according to claim 1 wherein the well is disposed in an axially off-set position on the rim base between the bead seats of the rim, the remainder of the rim base not forming part of the well comprising a slightly radially inwardly depressed portion.

3. A pneumatic tire and wheel rim assembly according to claim 1 wherein the closure means comprises an annular band split at one point about its circumference, the band having radially inwardly turned edges which are arranged to rest on circumferentially extending step portions formed one on each side of the well.

4. A pneumatic tire and wheel rim assembly according to claim 3 wherein the circumferentially extending notch in which the toe of an associated tire bead may be located is formed by the side of the well adjacent the outboard tire bead and the adjacent radially inwardly turned edge of the band.

5. A pneumatic tire and wheel rim assembly according to claim 4 wherein the notch is arranged to taper radially inwardly.

6. A pneumatic tire and wheel rim assembly according to claim 3 wherein a releasable securing means is provided to hold the annular band in position around the well of the rim.

7. A pneumatic tire and wheel rim assembly according to claim 1 in which the closure means comprises a filler member for the well.

8. A pneumatic tire and wheel rim assembly according to claim 1 wherein the closure means for the well defines in combination with each bead seat a circumferential notch, each bead having an extended toe portion projecting into the notch associated with its bead seat to restrain the bead from axial inward displacement.

* * * * *